US010212926B2

(12) United States Patent
Harrell

(10) Patent No.: US 10,212,926 B2
(45) Date of Patent: Feb. 26, 2019

(54) ROTATING TACKLE BOX

(71) Applicant: Anthony Harrell, Edwardsville, IL (US)

(72) Inventor: Anthony Harrell, Edwardsville, IL (US)

( * ) Notice: Subject to any disclaimer, the term of this patent is extended or adjusted under 35 U.S.C. 154(b) by 223 days.

(21) Appl. No.: 14/729,594

(22) Filed: Jun. 3, 2015

(65) Prior Publication Data
US 2015/0373963 A1 Dec. 31, 2015

Related U.S. Application Data

(60) Provisional application No. 62/007,115, filed on Jun. 3, 2014.

(51) Int. Cl.
*A01K 97/06* (2006.01)
*A01K 97/04* (2006.01)
*A01K 97/05* (2006.01)

(52) U.S. Cl.
CPC .............. *A01K 97/06* (2013.01); *A01K 97/04* (2013.01); *A01K 97/05* (2013.01)

(58) Field of Classification Search
CPC ...................................................... A01K 97/06
USPC .............. 43/54.1, 57.1; 206/315.11; 224/920
See application file for complete search history.

(56) References Cited

U.S. PATENT DOCUMENTS

| 503,722 | A | * | 8/1893 | Lewis | A01K 97/04 |
| | | | | | 43/55 |
| 1,507,746 | A | * | 9/1924 | Malsin | A47F 3/10 |
| | | | | | 312/125 |
| 1,993,144 | A | * | 3/1935 | Kasdan | A01K 97/06 |
| | | | | | 43/57.1 |
| 2,138,190 | A | * | 11/1938 | Myers | A01K 97/06 |
| | | | | | 43/54.1 |
| 2,225,309 | A | * | 12/1940 | Lawrence | A01K 97/06 |
| | | | | | 43/57.2 |
| 2,478,621 | A | * | 8/1949 | Attula | A01K 97/04 |
| | | | | | 206/315.11 |
| 2,503,490 | A | * | 4/1950 | Janz | A01K 97/06 |
| | | | | | 43/55 |
| 2,540,340 | A | * | 2/1951 | Linblade | A01K 97/06 |
| | | | | | 43/57.1 |
| 2,551,283 | A | * | 5/1951 | Parr | A01K 97/06 |
| | | | | | 312/220 |
| 2,596,214 | A | * | 5/1952 | Corkran | A01K 97/06 |
| | | | | | 43/57.1 |
| 2,603,549 | A | * | 7/1952 | Tessmer | A01K 97/06 |
| | | | | | 43/54.1 |

(Continued)

FOREIGN PATENT DOCUMENTS

EP 1407663 A1 * 4/2004 ............ A01K 97/06
JP 09047202 A * 2/1997

(Continued)

*Primary Examiner* — Darren W Ark
(74) *Attorney, Agent, or Firm* — Lewis Rice LLC

(57) ABSTRACT

A tackle box comprising a body and lid configured such that when the body and lid are closed, the combination forms a cavity sized and shaped for housing one or more rollers or spindles. The rollers have one or more compartments for storing fishing equipment, and a user can manipulate user controls to rotate the spindles and thereby cause different compartments to become accessible to the user when the tackle box is open.

12 Claims, 23 Drawing Sheets

(56) References Cited

U.S. PATENT DOCUMENTS

| | | | | |
|---|---|---|---|---|
| 2,604,372 A * | 7/1952 | Klinglesmith | A01K 97/06 43/54.1 |
| 2,665,517 A * | 1/1954 | Archer | A01K 97/06 43/57.1 |
| 2,702,442 A * | 2/1955 | Wallen | A01K 97/06 43/57.1 |
| 2,736,628 A * | 2/1956 | Fadden, Jr. | A47B 81/007 211/1.55 |
| 2,783,875 A * | 3/1957 | Shabarick | A01K 97/06 43/54.1 |
| 2,814,152 A * | 11/1957 | Trujillo | A01K 97/06 43/57.1 |
| 2,831,289 A * | 4/1958 | Klinghoffer | A01K 97/06 43/57.1 |
| 2,927,395 A * | 3/1960 | Bartlett | A01K 97/06 43/57.2 |
| 3,022,600 A * | 2/1962 | Glascoff | A01K 97/06 43/57.1 |
| 3,154,880 A * | 11/1964 | Campbell | A01K 97/06 43/57.1 |
| 3,180,053 A * | 4/1965 | Norton | A01K 97/06 43/57.2 |
| 3,197,915 A * | 8/1965 | Staver | A01K 97/06 43/57.1 |
| 3,286,390 A * | 11/1966 | Guice | A01K 97/06 43/57.1 |
| 3,378,134 A * | 4/1968 | Wilkinson | A01K 97/06 43/54.1 |
| 3,524,571 A * | 8/1970 | Pius | A01K 97/06 224/920 |
| 4,020,584 A * | 5/1977 | Michal | A01K 97/06 43/57.1 |
| 4,563,834 A * | 1/1986 | Spencer | A01K 97/06 43/57.1 |
| 4,653,220 A * | 3/1987 | Olsen, Sr. | A01K 97/06 43/57.1 |
| 4,697,379 A * | 10/1987 | McPhaul | A01K 97/06 43/54.1 |
| 4,756,412 A * | 7/1988 | Graves | A01K 97/06 43/54.1 |
| 4,770,327 A * | 9/1988 | Fortson | A01K 97/06 43/54.1 |
| 4,791,752 A * | 12/1988 | Van Kampen | A01K 97/06 43/54.1 |
| 4,999,943 A * | 3/1991 | Crabtree | A01K 97/06 43/54.1 |
| 5,025,588 A * | 6/1991 | Echols | A01K 97/06 43/57.1 |
| 5,289,940 A * | 3/1994 | Wisenbaugh | A01K 97/06 43/54.1 |
| 5,410,836 A * | 5/1995 | Hardy | A01K 97/06 43/54.1 |
| 5,526,927 A * | 6/1996 | McLemore | A01K 97/06 206/315.11 |
| 5,606,820 A * | 3/1997 | Suddeth | A01K 97/06 43/57.1 |
| 5,657,573 A * | 8/1997 | Fischer | A01K 97/06 43/54.1 |
| 5,857,285 A * | 1/1999 | Little | A01K 97/06 43/57.1 |
| 5,934,010 A * | 8/1999 | Blackburn | A01K 97/06 43/54.1 |
| 6,134,825 A * | 10/2000 | Moffett | A01K 97/06 43/57.1 |
| 6,427,834 B1 * | 8/2002 | Lin | A01K 97/06 43/54.1 |
| 6,516,555 B2 * | 2/2003 | Buzzell | A01K 97/06 43/57.1 |
| 7,552,560 B2 * | 6/2009 | Hoover | A01K 97/06 43/54.1 |
| 8,327,576 B2 * | 12/2012 | Sellers | A01K 97/04 43/54.1 |
| 8,468,740 B1 * | 6/2013 | Ryckman | A01K 97/06 43/54.1 |
| 2004/0074137 A1 * | 4/2004 | Levy | A01K 97/06 43/57.2 |
| 2006/0162234 A1 * | 7/2006 | Gagnet | A01K 97/06 43/54.1 |
| 2007/0234636 A1 * | 10/2007 | Schwartz | A01K 97/06 43/54.1 |
| 2008/0134566 A1 * | 6/2008 | Greaves | A01K 97/06 43/57.1 |
| 2008/0271361 A1 * | 11/2008 | Greaves | A01K 97/06 43/54.1 |
| 2014/0033602 A1 * | 2/2014 | Gesik | A01K 97/06 43/57.1 |

FOREIGN PATENT DOCUMENTS

| | | | |
|---|---|---|---|
| JP | 10329058 A | * | 12/1998 |
| JP | 2009261376 A | * | 11/2009 |
| WO | WO 0022923 A1 | * | 4/2000 ............ A01K 97/06 |

* cited by examiner

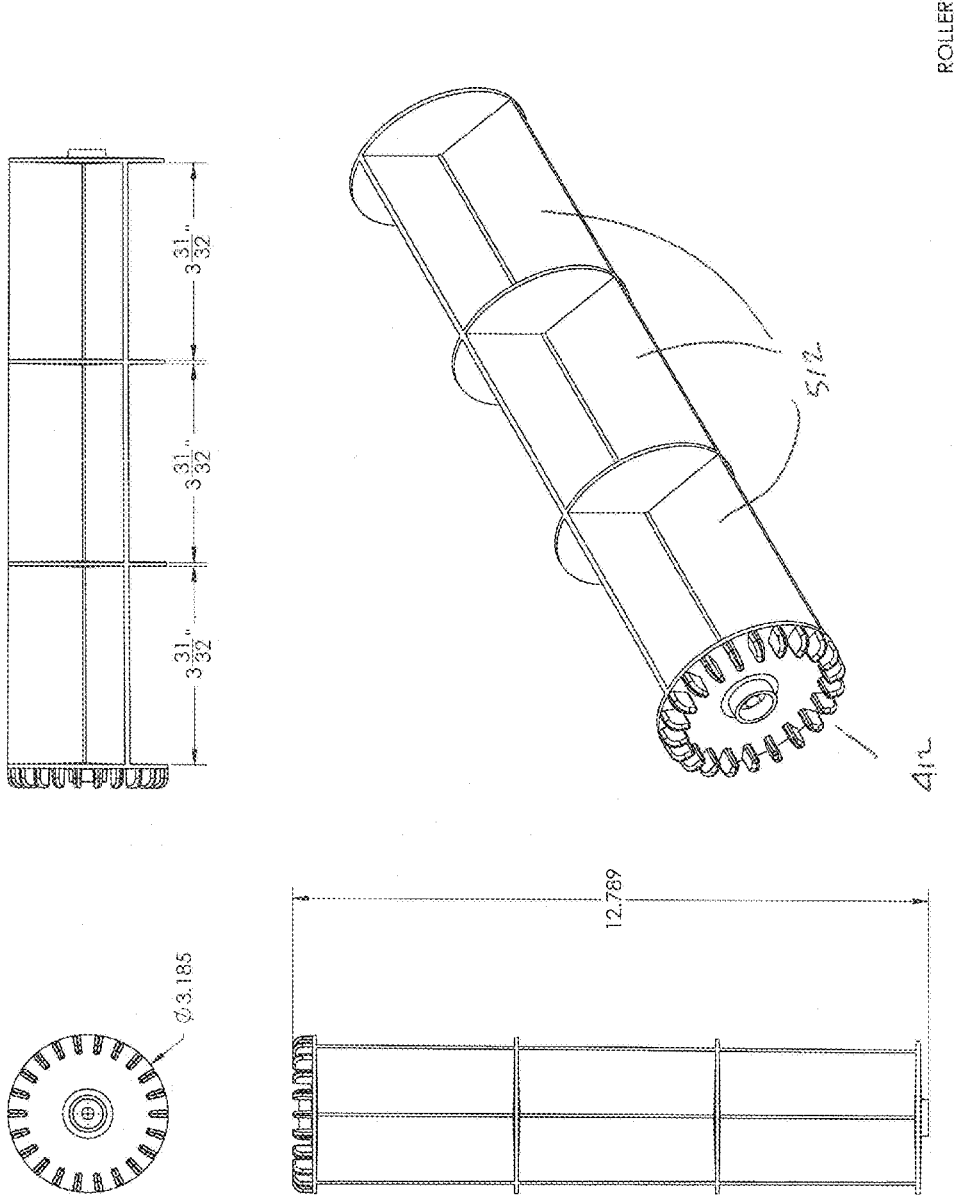

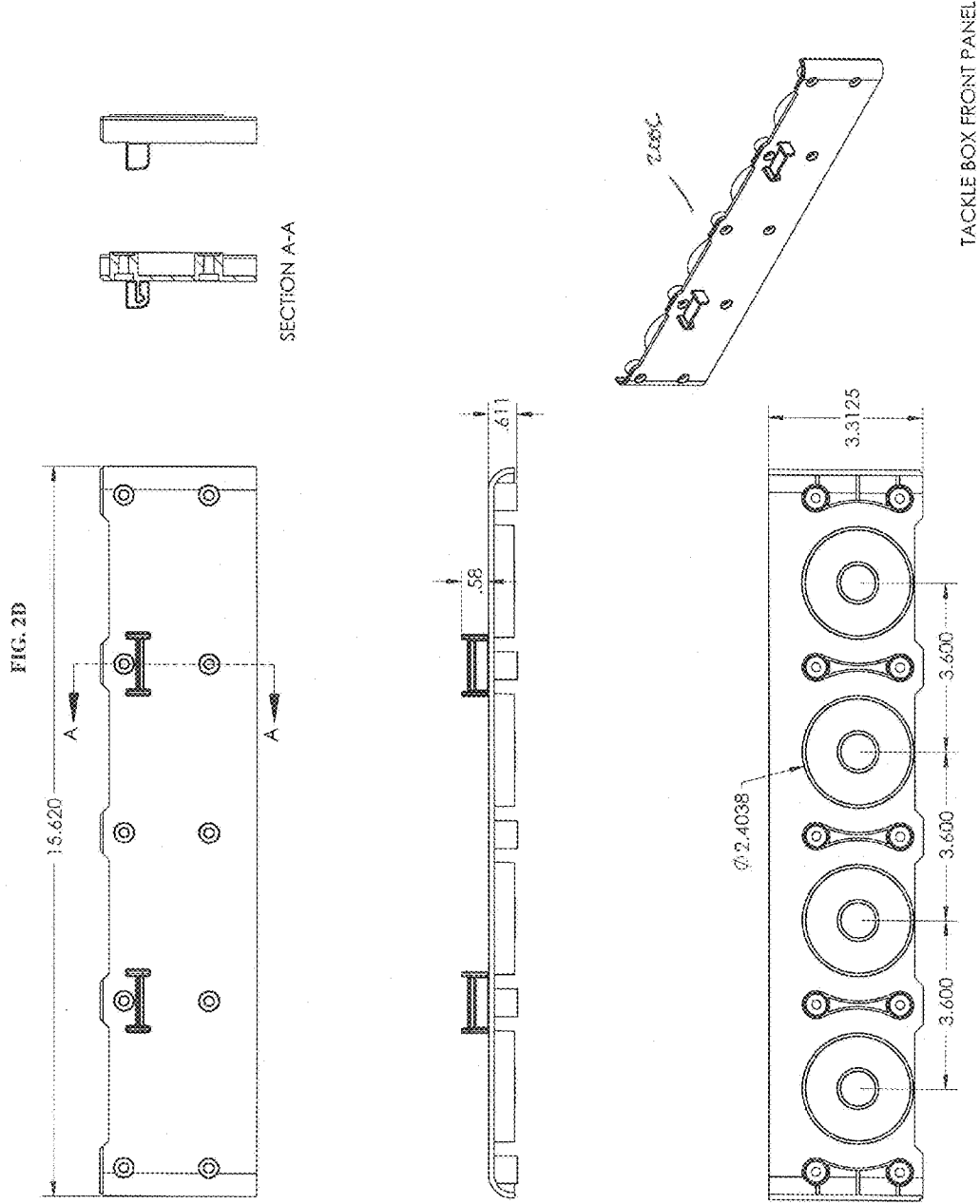

ROTATING TACKLE BOX

CROSS REFERENCE TO RELATED APPLICATION(S)

This application claims benefit of U.S. Provisional Patent Application Ser. No. 62/007,115, filed Jun. 3, 2014, the entire disclosure of which is herein incorporated by reference.

BACKGROUND

1. Field of the Invention

This disclosure relates to the field of sporting goods; more specifically, to tackle boxes and other storage containers for equipment for fishing or other outdoor activities.

2. Description of the Related Art

Fishing dates back to more than 40,000 years ago as a means of survival. Today, in developed countries, fishing for food has mostly transformed into a commercial enterprise. However, there still exists great number of people who enjoy recreational fishing; in fact, competition fishing is a very popular sport worldwide. Recreational fishing usually employs the angler technique which involves a hook which is attached to a line which is attached to a reel which is attached to a rod. Connected to the hook is usually bait, such as a lure. Bait is a substance, usually a potential food, which is used to attract and catch a fish. A lure is an artificial device designed to mimic the appearance of a type of bait or a natural food source.

The mechanics and equipment related to angling fishing have remained fairly constant throughout time. The equipment used by fisherman includes hooks, lines, sinkers, floats, rods, reels, baits, lures, spears, nets, gaffs, traps, waders and tackle boxes. Tackle boxes are devices for transporting fishing-related accessories, such as, but not limited to, baits, lures, and tackle in general.

Tackle boxes were originally manufactured from wood, but today they are most commonly plastic. Most common tackle boxes consist of small statically separated compartments to house lures.

A lure is a type of synthetic fishing bait which is designed to attract a fish's attention. A lure uses movement, vibration, flash and color to attract fish. Many lures are equipped with one or more hooks. There are many types available, such as: a jig, surface lures, spoon lures, plugs, artificial flies, spinnerbait, swimbait, and fish decoys. Certain lures, such as artificial flies or spinnerbait, often have elongated elements made of thin material so as to imitate a fish's natural food source. A streamer fly, such as a Wooly Bugger or a Clouser Deep Minnow, are examples of artificial flies that have elongated elements. Such elongated elements often get tangled and intertwined by themselves and when placed in close proximity to similar elements, the elongated elements often tangle, like cables of earbuds when left in a pocket. The lures are less functional, or nonfunctional, when the elements are intertwined. Untangling elements is frustrating for a recreational fishermen and problematic in a competitive fishing setting. The time spent untangling elements is simply wasted because the problem does not have to occur.

Today, one of the only known methods of reducing the frequency of the tangling of such elements is to have individual compartments within a tackle box for each lure, which is usually a drawer or tray configuration. This often results in larger, more cumbersome tackle boxes.

A number of other solutions for reducing the likelihood of tangled lures have been proposed. In particular, U.S. Pat. No. 8,468,740 to Ryckman shows an adjustable fishing tackle box. This device employs the use of guide slots and angular panels with spaced slots. This device, and ones similar to it, suffer from the drawback of lures having the potential to become intertwined with each other. Lures are often made of varying lengths and by design might have thin string-like attachments connected to their ends. These thin string-like attachments, when in close proximity to each other, have a tendency to become interconnected, and because of the slot design arrangement of this device, it is likely that the interconnection will occur upon transportation and operation of the device.

Sellers, in U.S. Pat. No. 8,327,576, shows a container with a removable portion with segregated compartments designed to house fishing lures. This invention has shortcomings in that the removable portion is often lost or is cumbersome for users to operate in conditions where the box was intended to be used, for instance, on a boat, which has limited space and is moving and is subject to the wake of the water. The segregated compartments also limit the type of bait which can be housed according to the fixed dimensions of the compartments.

Some commercially available devices employ separators, usually thin plastic drop-in removable portions. These removable portions can be great for cleaning purposes but leave a lot to be desired as the user must spend some time lining up a lure to fit into the drop-in inserts. This presents a problem when the speed of removal and insertion needs to be minimal, such as in competitive fishing. In addition, the tails of spinnerbait still have the ability to become intertwined with one another.

Other currently commercially available tackle boxes employ a different solutions to the problem of tangling lures, but all of them still suffer from tangling when in use. For example, the lines connected to the lures can be stretched when contained in removable divisions. These removable divisions can become dislodged when attempting to remove a single lure, which then creates a domino effect often un-securing unintended lure lines, which then defeats the purpose of the removable divisions.

Users can often find traditional tackle boxes frustrating when items being stored, such as lures, get tangled together, which can lead to the item being ruined for its intended purpose. The efficiency of a tackle box is largely a matter of user convenience. Typical users want to be able to locate the exact item they desire quickly, want to be able to extract the item from the storage compartment in an easy non-obtrusive manner, and also want to quickly return items back into the tackle box in a fashion that avoids entangling. Size is one of the main limiting factors of the storage capacity of tackle boxes.

Current devices attempt to maximize tackle storage capacity by employing various means, such as drawers, hinged compartments and hook arrangements. Adding drawers increases the cost of production due to the number of elements necessary. In addition, the drawers require a locking mechanism or else they could open during transportation or require special care. This is problematic as tackle boxes are often used on a boat, which is inherently not a smooth experience; the effects of wake could open the drawers. Some devices employ semicircular hook retainers for which a user can secure lures with hooks, which is problematic as lure hooks vary in size, and the retainers need to be sized accordingly. In addition, ease of removal is greatly reduced because the hooks have to be moved in a certain way to be removed, which is not ideal if a boat is rocking, and this is usually a process that requires two hands. These "solutions,"

while better than individual boxes or one big open storage space, are still lacking as user frustration is still present as the lures are still often tangled together. Tackle box manufactures have long sought means to effectively maximize the storage capacity of the devices while maintaining a frustration-free user experience.

SUMMARY

The following is a summary of the invention which should provide to the reader a basic understanding of some aspects of the invention. This summary is not intended to identify critical components of the invention, nor in any way to delineate the scope of the invention. The sole purpose of this summary is to present in simplified language some aspects of the invention as a prelude to the more detailed description presented below.

Because of these and other problems in the art, described herein, among other things, is a tackle box comprising: a housing having a housing interior volume and a housing exterior surface, a lid connected to the housing, the lid having a lid interior volume and a lid exterior surface, wherein the lid can be opened to provide access to the housing interior volume and closed to prevent access to the housing interior volume; a cavity, defining a portion of the housing interior volume and a portion of the lid interior volume; the cavity including: a spindle, the spindle having an elongated length and being within the cavity; at least two partitions attached to and extending along the length of the spindle so as to subdivide the spindle along the length wherein the space between the partitions defines a storage compartment; wherein the spindle is configured to rotate circularly within the cavity to selectively reveal the storage compartments.

In an embodiment, the lid is removable.

In another embodiment, the housing interior comprises a plurality of the cavities.

In another embodiment, the rotating is controlled via a control located on the exterior surface of the device.

In another embodiment, the partition of the spindles are adjustable.

In another embodiment, the spindle is magnetic.

In a further embodiment, the magnetic spindle provides sufficient magnetic force to retain a lure containing a ferrous material placed in the storage compartment within the storage compartment during rotation of the spindles.

In another embodiment, a hygroscopic substance is housed within the interior volume.

In another embodiment, the storage compartments houses a lure.

In a further embodiment, the lure includes: jigs, surface lures, spoon lures, plugs, artificial flies, spinnerbait, swimbait, and fish decoys.

In another embodiment, the housing is attached to a second housing.

In another embodiment, the second housing is that of a different tackle box.

In another embodiment, the partitions are separated by a divider.

In another embodiment, the lid is transparent.

In another embodiment, the partition has a fin extending therefrom.

BRIEF DESCRIPTION OF THE DRAWINGS

FIG. 2B provides a schematic and isometric drawing of an embodiment of a spindle or roller for the tackle box depicted in FIG. 1.

FIG. 2D provides a schematic and isometric drawing of an embodiment of a front panel for the tackle box depicted in FIG. 1.

DESCRIPTION OF THE PREFERRED EMBODIMENT(S)

Figure 1:
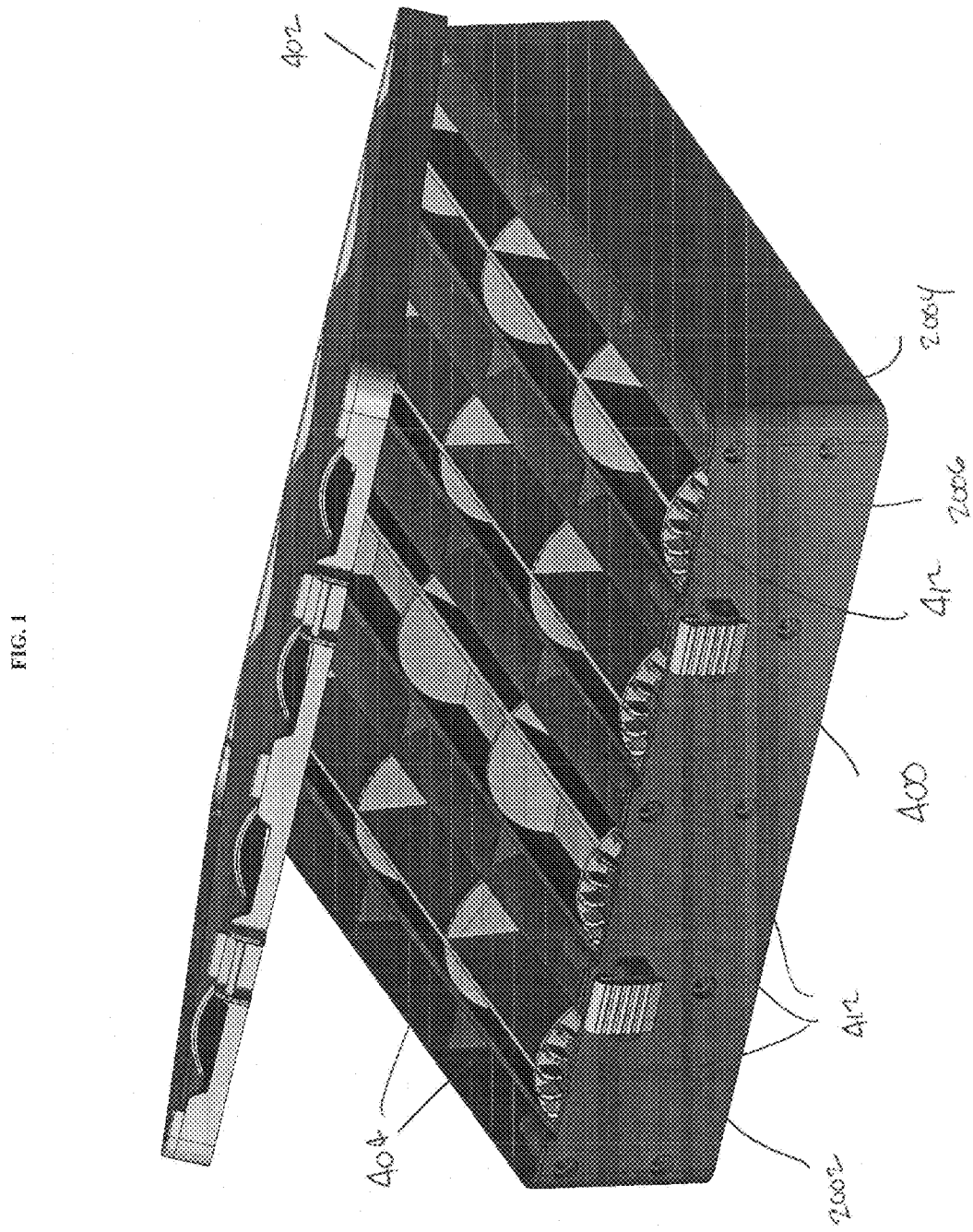
FIG. 1 provides an isometric drawing of an embodiment of a tackle box having a plurality of spindles.

The following detailed description and disclosure illustrates by way of example and not by way of limitation. This description will clearly enable one skilled in the art to make and use the disclosed systems and methods, and describes several embodiments, adaptations, variations, alternatives and uses of the disclosed systems and apparatus. As various changes could be made in the above constructions without departing from the scope of the disclosures, it is intended that all matter contained in the above description or shown in the accompanying drawings shall be interpreted as illustrative and not in a limiting sense.

The device described herein is a tackle box which reduces the likelihood of lure tangling while still having reduced space requirements and providing for ease of removable and addition of lures, specifically a tackle box which houses storage compartments which rotate about an axis. The device is preferably designed to be easily carried by the user and provide the user with ready access to the contents of the storage compartments of the device.

In the embodiment of FIGS. 4-15, a device includes a main housing (400), an internal volume (418), an inner surface (408) with a cavity or cavities (404) which has an inner volume (514) and an exterior surface (506) which also houses a spindle or roller (412) sized and shaped according to the dimensions of the cavity (404) which rotates about an axis of rotation (504) within the cavity (404), an exterior surface (410), a detachable lid (402) with an interior volume (422) defined by an interior surface (423) and an exterior surface (420), a bottom side (1102), a side with controls (416), and rotation controls (406).

The main housing of the device (400) is preferably designed to provide a robust protective casing and enclosure for various components of the device. The main housing (400) has a generally hollow interior volume (418), in a preferred embodiment the main housing (400) is produced via molded plastic. In the embodiments depicted in FIGS. 4-15, the main housing (400) is shown to be generally rectangular; however, this is not intended to be limiting in that the main housing can be designed to be a nearly infinite number of shapes. In some embodiments, the main housing (400), related components, and the device as a whole will be designed to conform to the design and dimensional constraints of certain tackle box holding devices, such as those on some boats.

Figure 6:
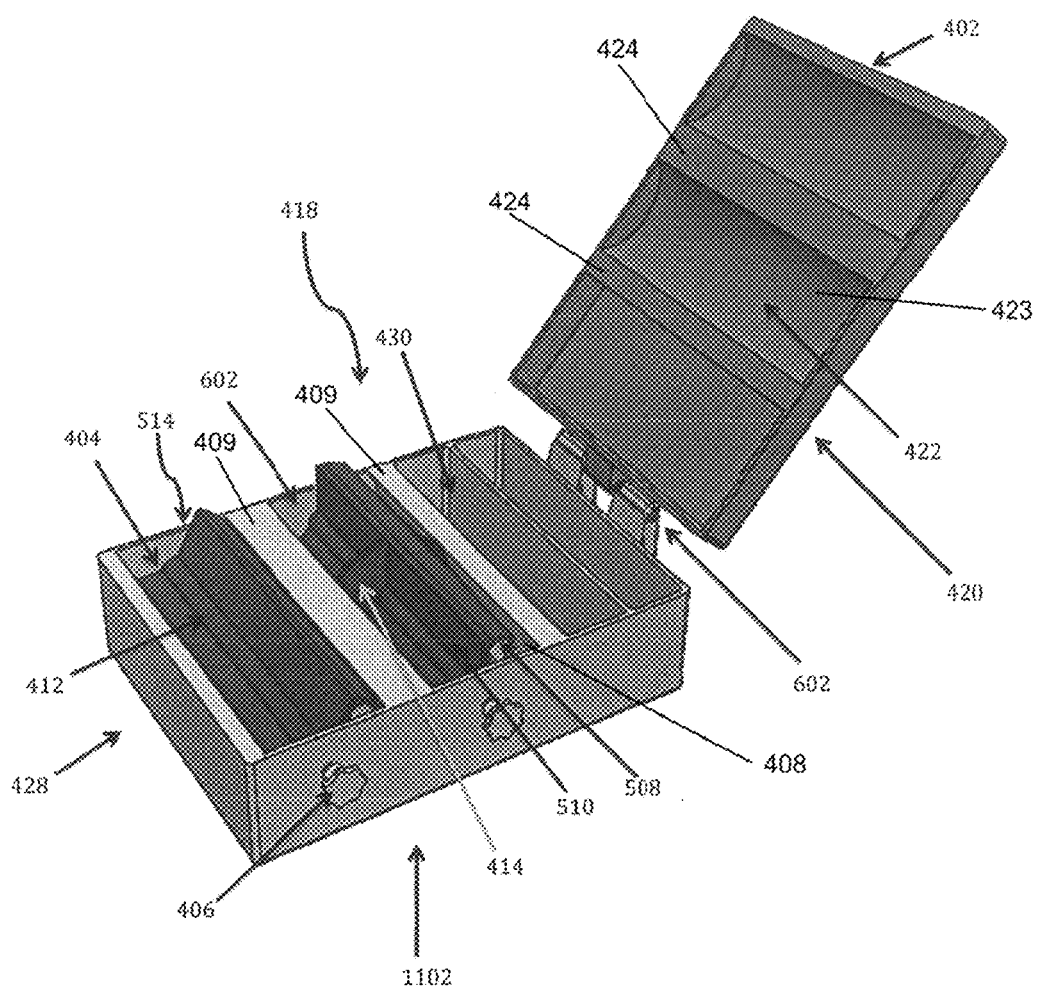
FIG. 6 provides a side elevated view of the embodiment of FIG. 4 in which the lid is in the open position.
Figure 7:
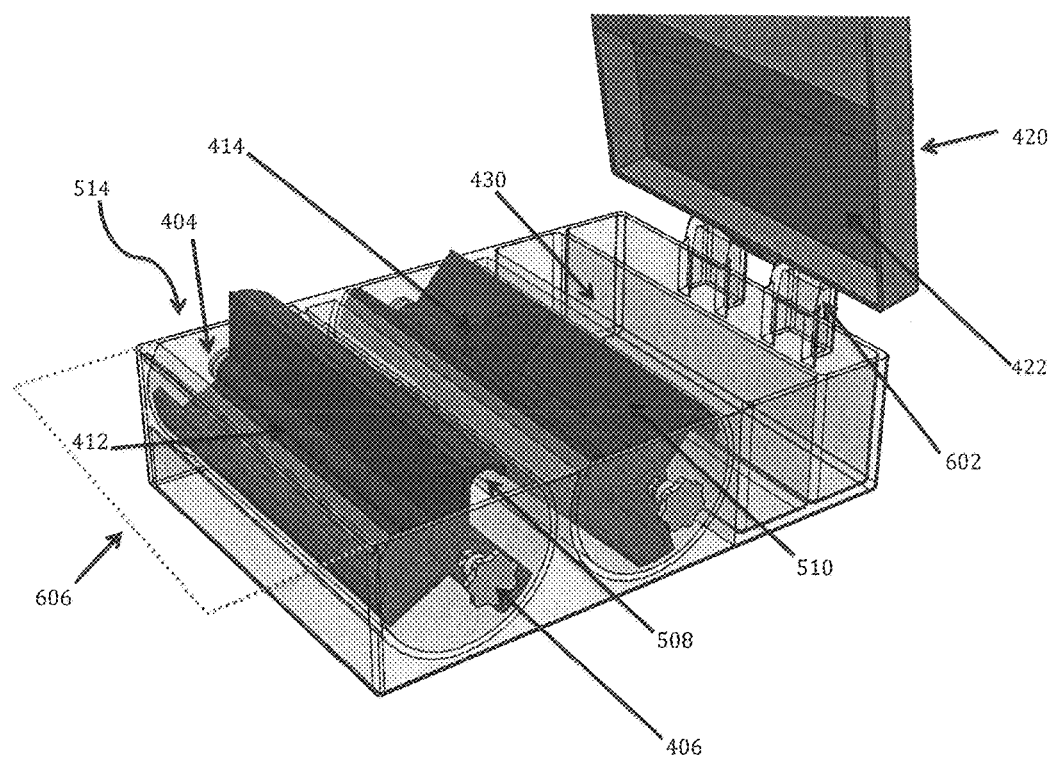
FIG. 7 provides a transparent cutaway side perspective view of the embodiment of FIG. 4 in which the lid is in the open position.
Figure 8:
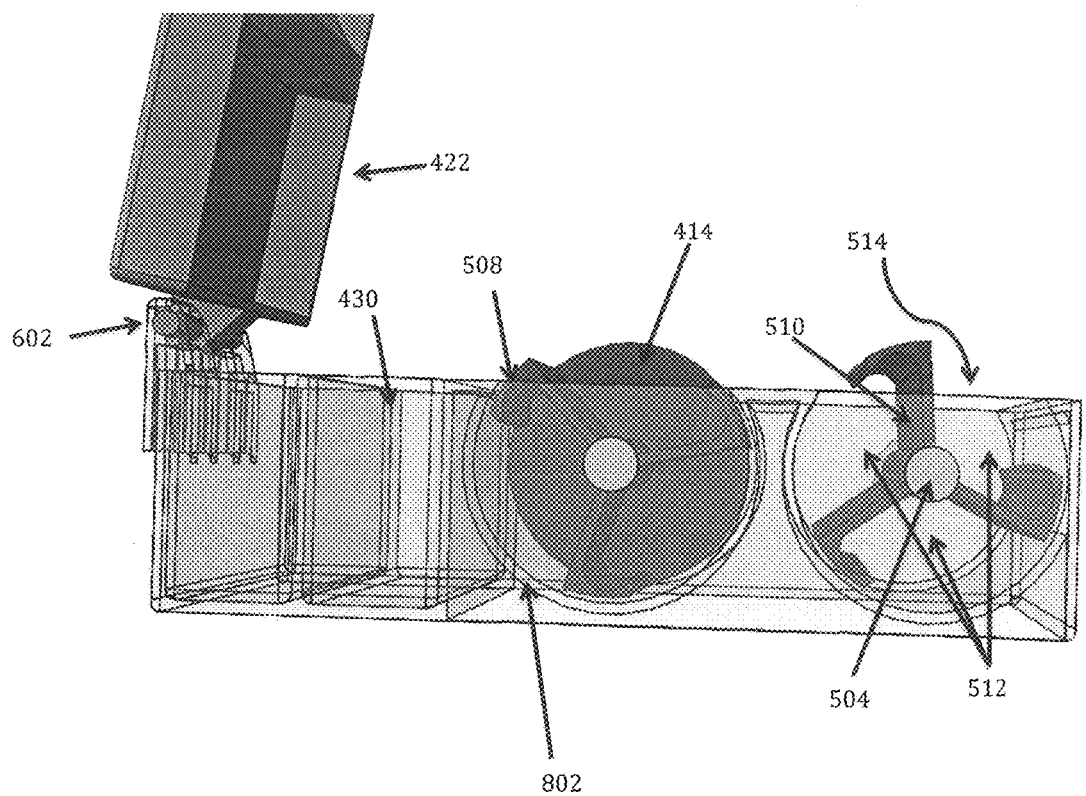
FIG. 8 provides a transparent side cutaway view of the embodiment of FIG. 4 in which the lid is in the open position.
Figure 9:
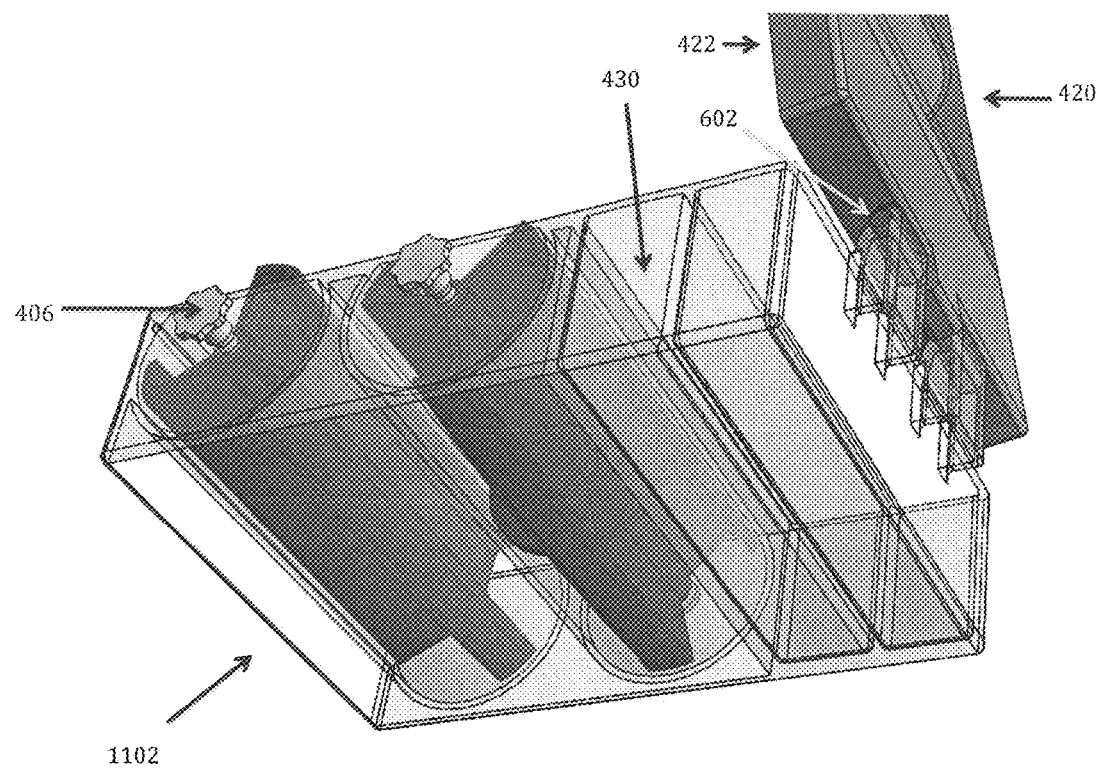
FIG. 9 provides a transparent cutaway underside perspective view of the embodiment of FIG. 4 in which the lid is in the open position.
Figure 10:
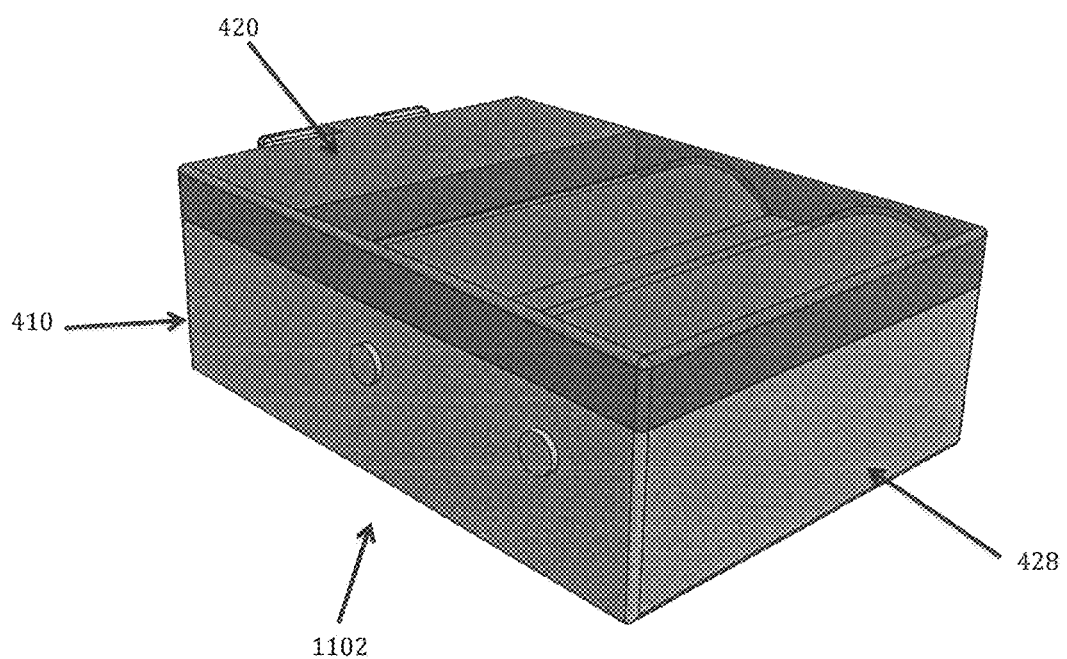
FIG. 10 provides a side view of the embodiment of FIG. 4 in which the lid is in the closed position.
Figure 11:
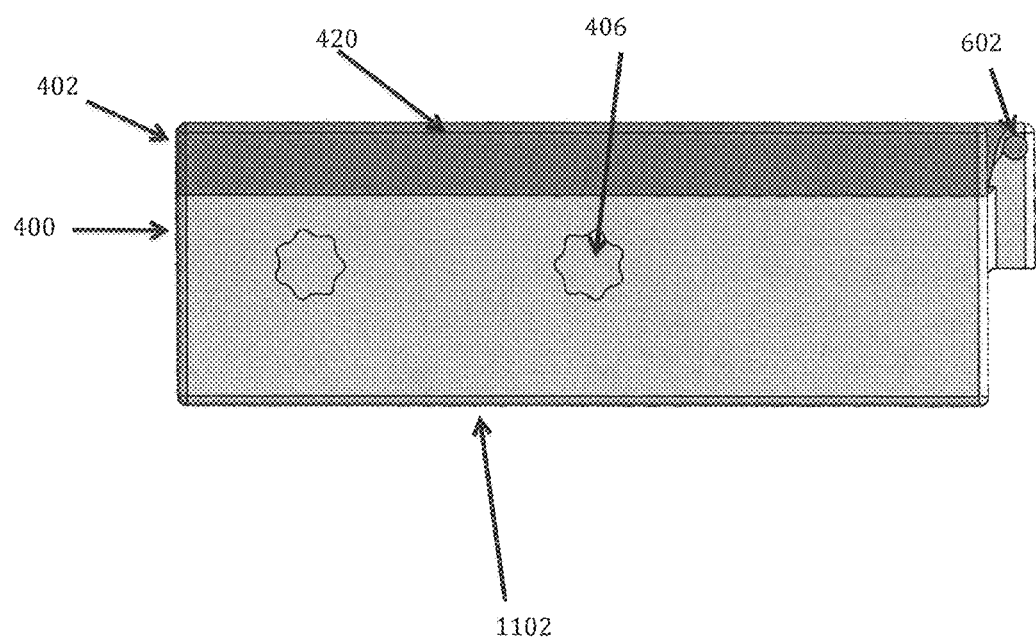
FIG. 11 provides a side planar view of the embodiment of FIG. 4 in which the lid is in the closed position.
Figure 12:
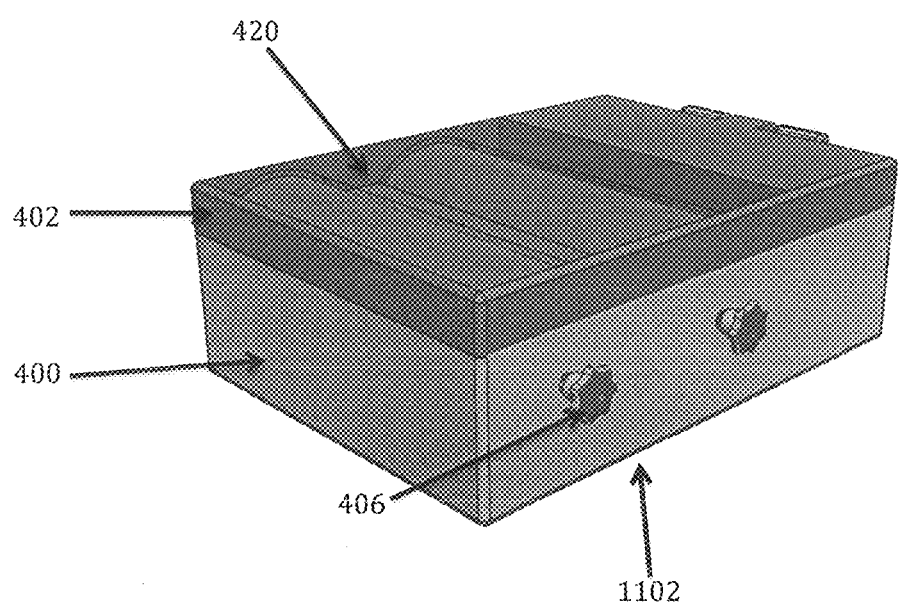
FIG. 12 provides a side perspective view of the embodiment of FIG. 4 in which the lid is in the closed position.
Figure 13:
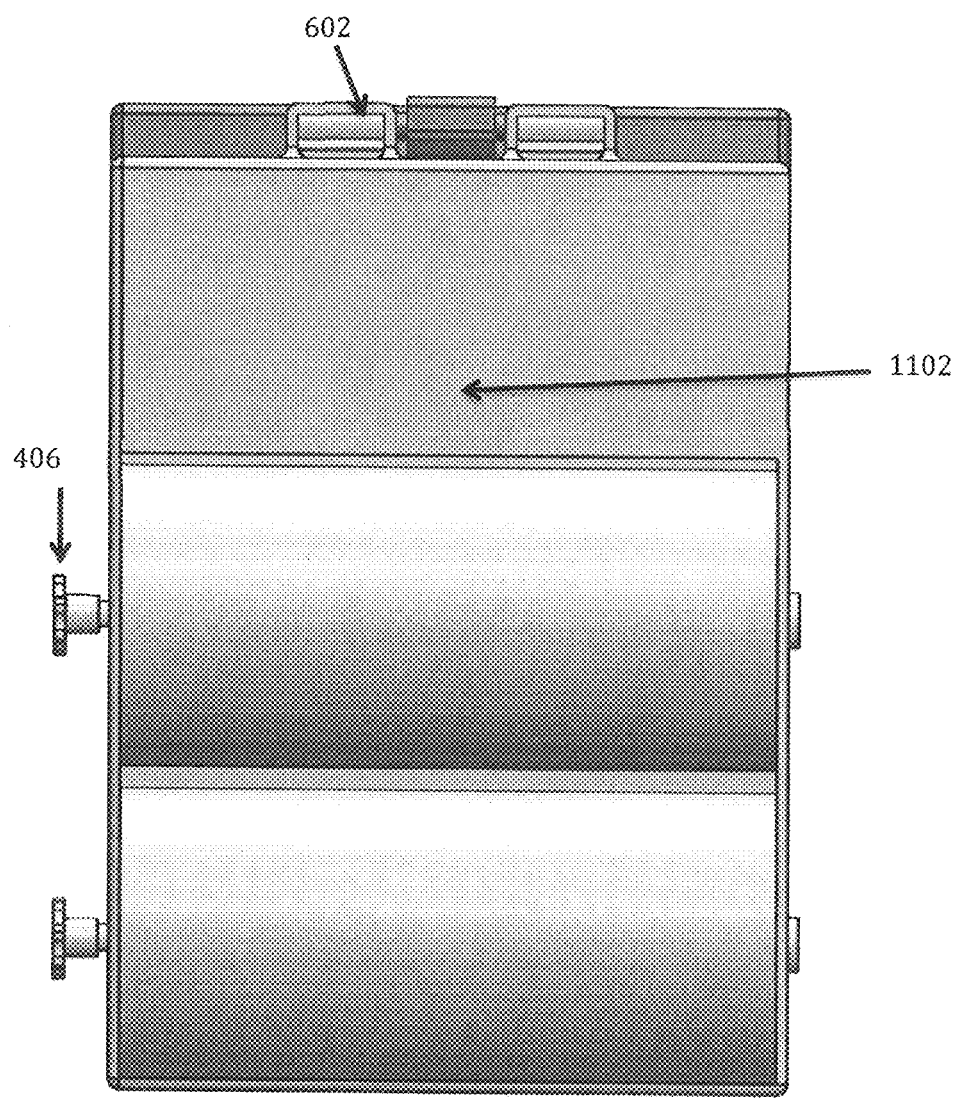
FIG. 13 provides a bottom planar view of the embodiment of FIG. 4.
Figure 14:
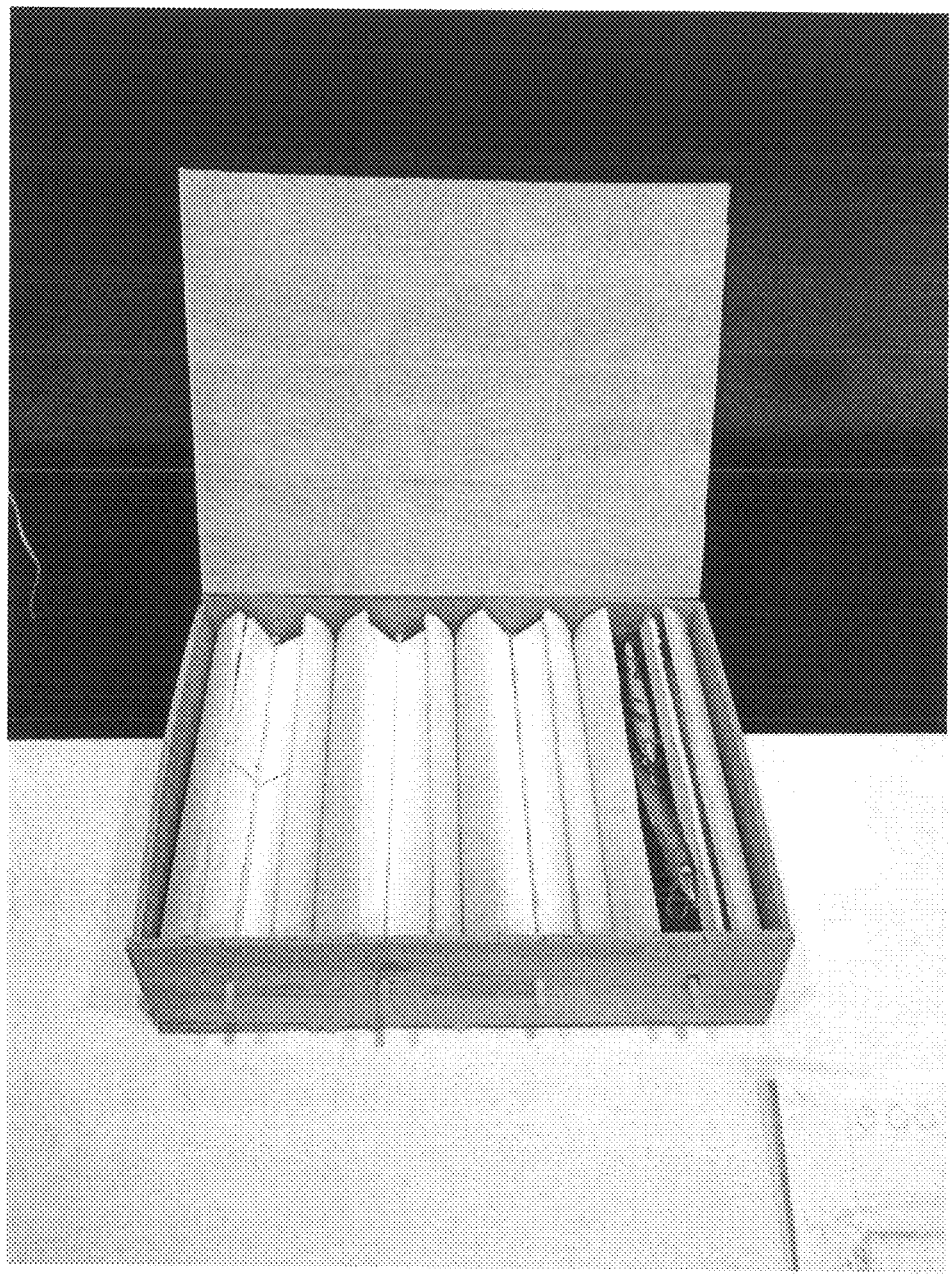
FIG. 14 provides a perspective side view of a prototype embodiment of the device in which the lid is in the open position.
Figure 15:
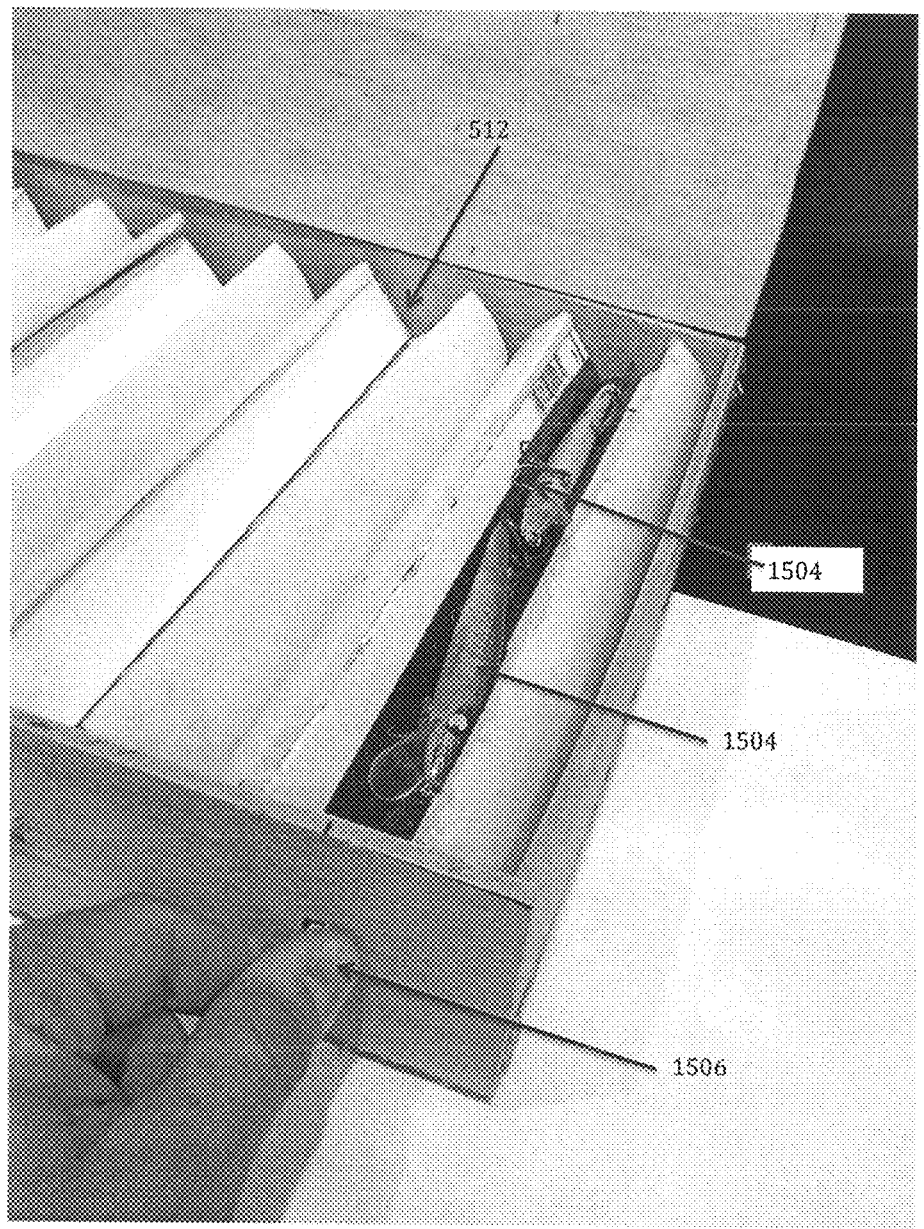
FIG. 15 provides a side view of the embodiment of FIG. 14 with lures housed in the storage portion and a user operating the control knobs.
Figure 16:
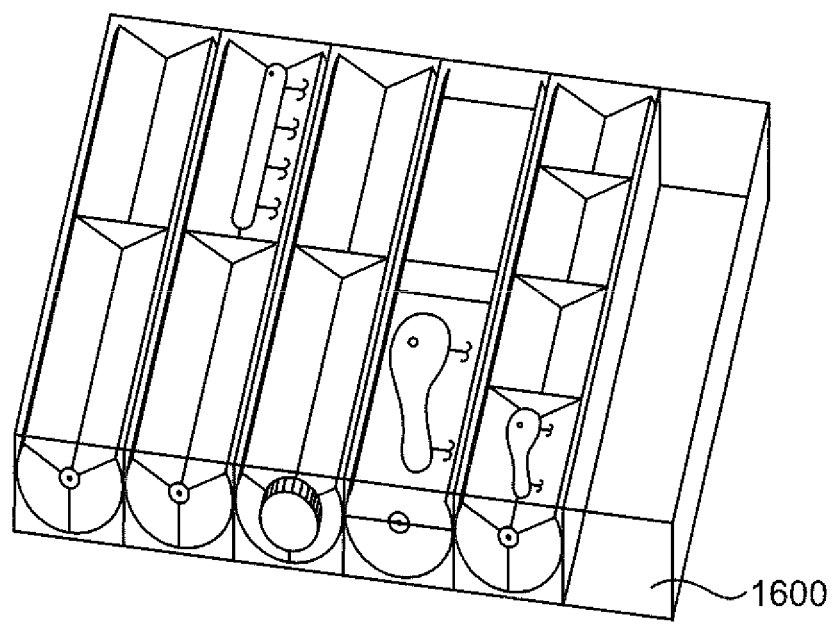
FIG. 16-FIG. 19 provide schematic drawings of embodiments of the device.
Figure 17:
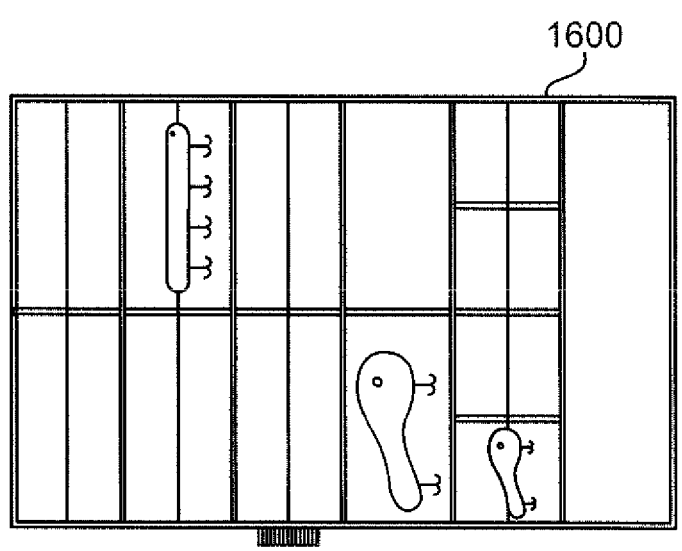
Figure 18:
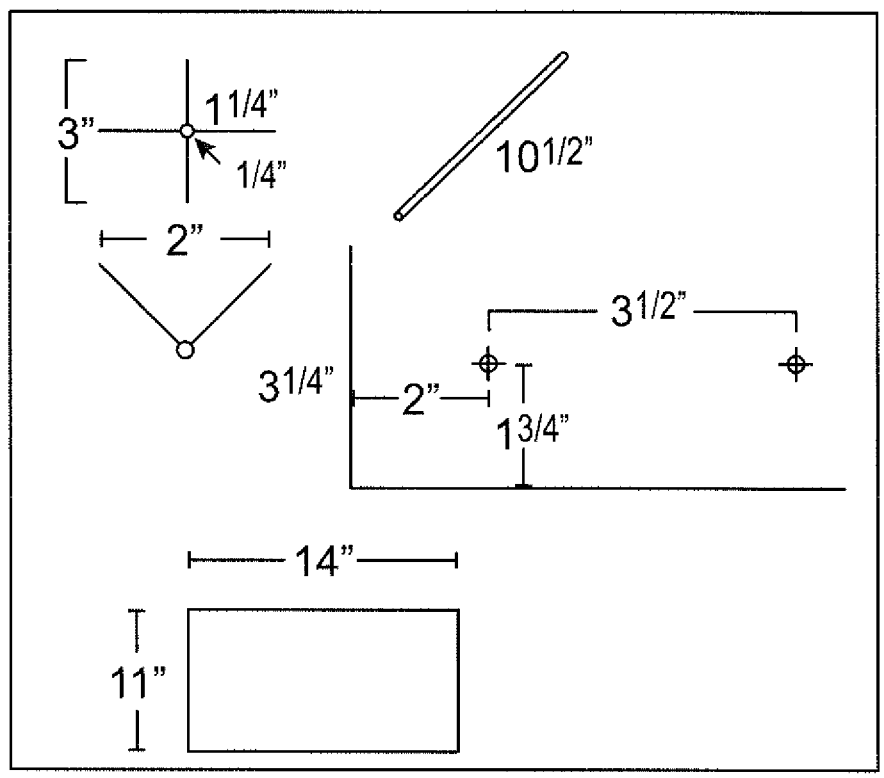
Figure 19:
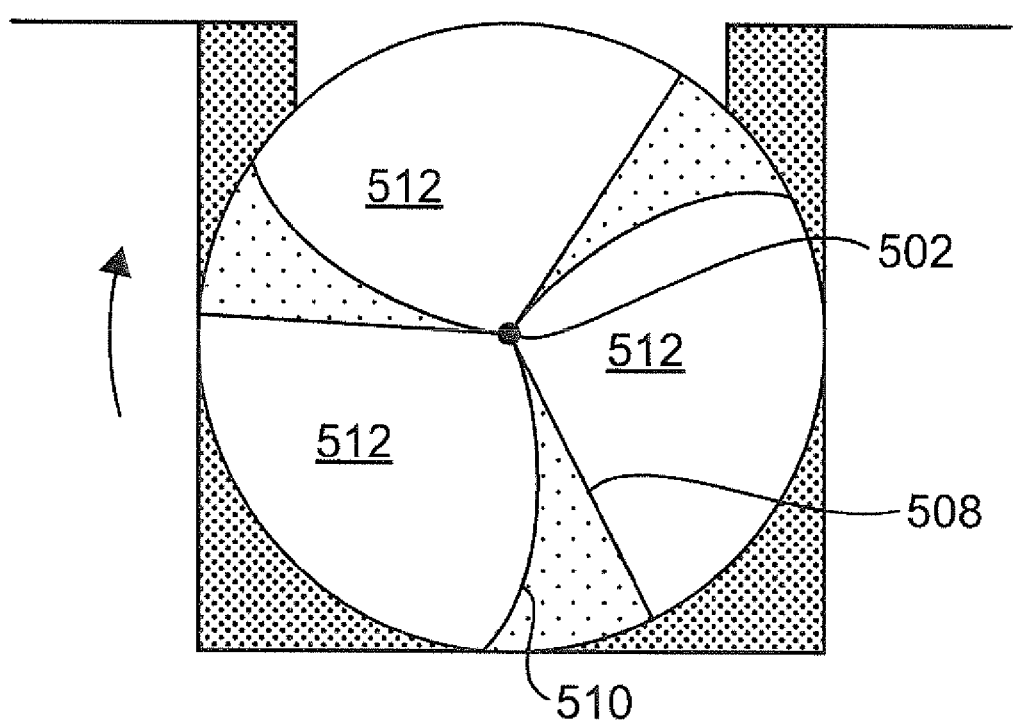

The main housing (400) contains a cavity (404). A portion of the cavity (404) is contained in the lid (402). More specifically, a portion of the cavity (404) is contained in the interior volume of the lid (422), so as to expose a portion of the spindle (412) when the lid (402) is removed or in the open position, and provides the user access to the desired compartment of the spindle (412). The portion of the spindle (412) which is exposed is controlled via user controls (406) and is configured so as to expose a specific portion of the spindle (412), referred to as a compartment (512). In an embodiment, about ⅓ of the cavity (404) is contained within the interior volume of the lid (420). A cavity (404) is configured to allow the one or more spindles (412) circular rotation; the rotation is controlled by the user via the user controls (406). Each cavity (404) is separated from another cavity by a planar portion (409) of the housing inner surface (408) and a planar portion (424) of the lid inner surface (423) as shown in FIG. 6 which face each other and extend between the cavities when the lid is closed.

The main housing (400) has hinges attached thereto (602) which connect the main housing (400) to the lid of the device (402). In some embodiments the hinges (602) of the device can be removable so as to enable a complete removal of the lid (402) from the main housing (400). The hinges (602) are configured to allow the user access to the rotating storage compartments (512) via opening or removing the lid (402).

Housed inside each cavity (404) is a spindle (412) which rotates on an axis of rotation (504). The axis (504) is constrained by the cavity (404), and rotation is controlled via rotation controls (406) which are located on the exterior of the device (604). The rotation controls (406) connect to a spindle (412) and provide the user with the ability to hand rotate a spindle (1506) as so desired. In an embodiment, the spindle (412) is keyed so as to only rotate in one direction, clockwise or counter clockwise. In the depicted embodiment, the spindle (412) is configured to be sized and shaped according to the interior volume of the cavity (514).

In the depicted embodiment, the ability to provide a scooping function via a fin (508) which extends from the partition (510) of the spindle (412) to approximately the inner volume of the cavity (514) is shaped to retain stored lures (1504) during rotation within a particular compartment (512) of the spindle. In some embodiments, the cavities (404) contain small holes which are configured to provide drainage of liquids, for instance water; these holes will lead liquid to the external surface (410) of the device. In some instances, this will simply be one or more small holes in a cavity (404) located where the cavity abuts the bottom side (1102) of the device.

In some embodiments of the device, the spindle (412) contains magnetic elements. The magnetic elements are configured to provide an attraction between metal components of the item which is being stored and the axis of rotation (504) or fin (508), for instance, the metal hook of a lure (1502). In such an embodiment, the item being stored, for instance, the lures, would have an attractive force to the axis (504), which is encased by a spindle (412), thereby maintaining its position on the spindle (412) during rotation, but the attractive force could be overcome by the user when the user wished to remove the tackle from the storage compartment.

A spindle (412) is housed in a cavity (404), has a partition (510) which extends from the axis perpendicularly out to near the inner volume of the cavity (514), is parallel to the axis (504) and extends the length of the spindle (606) but can be configured to be of varying dimensions. Extending out from the partition (510) is a fin (508). The shape and quantity of partitions (510) and fin(s) (508) extending therefrom are dependent on the type of lure, or other type of tackle, which is to be stored in the device. In a particular embodiment, there are three partitions (510), each spaced generally about every 120 degrees of the axis (504), thereby constructively providing three individual storage compartments (512). These three storage compartments would form generally "v" shaped compartments (512) when viewing the spindle (412) from the side. In other embodiments, the partitions (510) are spaced indiscriminately and can be situated at any one or more points on the spindle providing a variable amount of storage compartments. A divider (414) extends out perpendicular from the axis of the spindle (504), and generally fills the cavity along one direction to, thereby, further divide the storage compartments. Such spacing can be configured to correspond to the dimensions of a particular lure to be stored, effectively creating a multitude of storage compartments. The divider (414) is of a thickness to provide separation between stored lures while concurrently maintaining rigidity. The divider (414) will generally be of similar thickness to that of the thickness of the partition (510) of which it divides. The width and length of the spindles (412) are dependent on the dimensions of the cavity (404). In a particular embodiment, the length of a spindle (606) is the maximum allowed within the limits of efficient manufacturing which still allows for rotation of the spindle (412) within the cavity (404), i.e., as large as possible to be within an acceptable tolerance range while providing the functionality of rotation.

In one embodiment of the device, the dividers (414) and partitions (510) of a spindle and the spindle itself (412) are magnetic and fully user adjustable. In other embodiments, the adjustability of the dividers (414) and partitions (510) can be achieved by a series of fasteners and retainers adjustable by the user.

The spindles (412) can be designed to rotate circularly in both directions, counterclockwise and clockwise. In some embodiments requiring greater precision, the rotating components would be designed to only rotate in one direction, for instance counterclockwise. This might be because the partitions (510) would be designed in such a way as to enable the rotation of stored lures that would otherwise get caught in the divisional elements of the rotating parts during rotation. This enables the fins (508) to be designed to provide superior grabbing characteristics during rotation. In addition, the rotation could be configured to allow rotation in such a way so as to expose only one compartment (512) at a time. In the particular embodiments displayed in FIGS. 4-13, this would provide for a partial rotation for each of the three compartments.

The improved tackle box has rotating storage compartments on the internal volume of the housing (418). These rotating compartments can be divided to house fishing accessories of a multitude of sizes via different configurations of the spindles (412). In some embodiments, the spindles (412) will be removable and replaceable so as to allow the user to insert a spindle with the divider (414) located in different locations along the spindle. In this embodiment, the axis (504) of the spindle (412) can be configured so as to have a spring motion similar to that of a watch band so as to allow the spindle (412) to be removed but still maintain tolerances which allow circular rotation of the spindle.

In one embodiment, the device is configured to be modular, in that the external surface (416) is able to connect and attach with additional components while maintaining its external shape or style. For example, the device might only have one rotating storage compartment, but additional ones may be added to it easily via internal buckles or snaps to constructively become one connected device. The modular components can be configured to operate independently or in conjunction with other modular or non-modular components. So, the add-on's can be designed to fit in a near seamless manner with the original base structure. In a particular embodiment, the lid (402) is configured to enclose a cavity (404) with hinges (602) situated on a side of the device (416 or 424), and incorporated into the ends (428 and 426) of the main housing (400) is a coupling configured to attach and receive additional main housings. The coupling can be a series of retainer clips, both male and female, magnets or other attachment mechanisms which allow the main housing (400) to connect with additional housings. The aforementioned modular embodiments are configured so as to allow the user to configure the device as desired, for instance, with specific spindle configurations. In a particular modular embodiment different sized lids (402) are used, which allow for multiple modular elements to be enclosed by one lid.

In an embodiment of the device, a compartment, is reserved for storage of a desiccant or hygroscopic substance. This could be as simple as a compartment sized to fit commercially common silica gel packets. In one particular embodiment employing this element, a storage compartment is located on the bottom side (1102) of the device which is in near contact with the exterior walls of the generally cylindrical storage compartments (404).

In some instances, users have certain accessories which are of a peculiar shape which is not beneficial for storage within a spindle (412) or simply not desired by the user to be stored in a spindle (412). So, in yet another embodiment, the device also would incorporate traditional divisional storage compartments (430) without the rotational component, configured for accessories needing a static storage compartment. These storage compartments (430) can vary in size and can also be included in an available attachments in the modular embodiments discussed above. The modular attachments can also include attachments which have storage compartments, such as drawers and hook receptors.

The device is not intended to be limiting to a particular type or lure, such as the preferred spinnerbait. In fact, the device is designed to accommodate multiple types of lures, and other types of tackle. In one embodiment, there could be a rotating compartment designed to store live bait. In this embodiment, water (salt, fresh, or of a type desired by the user) is added to the device, and the lowest ⅔ of the spindle (412) could be in such water, so when the user rotates the spindle (412), it grabs the bait, leaving the water at the bottom. The top of this would be designed to keep it from leaking during transportation, in a particular embodiment, the lid (402) would be configured to provide access to a specific cavity so as to allow the entire cavity to contain water. In this embodiment, the spindle (412) includes holes to allow for rotation of the spindle (414) through water. Also provided in this embodiment are drain holes located at the bottom of the cavity (404), these holes will be user adjustable so as to provide a seal or drainage depending on the user's needs.

Because tackle boxes are usually used in an aquatic setting, they sometimes inadvertently make their way into water. Because of this, in another embodiment, the device is configured to float. This could be done through various means, whether it would be by attaching a buoyant accessory or pressurizing a sealed compartment with a gas, i.e., air. In yet another embodiment the bottom side of the device (1102) is hollow and is configured to provide buoyancy.

Misplaced items are a commonality not specific to the fishing world. To combat misplaced tackle boxes, in another embodiment, the device would also incorporate a tracking device. This device connects to a wireless electronic device via wireless means. For instance, it could contain a processor and power source which communicates via Bluetooth or a specific radio frequency recognized via a smartphone and also has the ability to transmit a beacon which would be recognized by another device. In some embodiments, the tracking device has cellular or similar wireless data capabilities which would enable the user to track their box if it was lost or stolen. The electronics associated could require charging of the power source, in which case an electronic charging port would be incorporated into the exterior surface of the device (410). In some instances this could be achieved via inductive charging.

In another embodiment, the device could have a specific container designed to store an electronic device, such as a cellular phone, smartphone, iPod or equivalent. This could help users have a place to store the device. This embodiment could be water resistant or waterproof in case the user drops the box into water or if it is raining. This storage compartment could also have means for charging the device either wirelessly or through traditional method. The device could have an internal power source, such as a battery, or could connect to traditional power sources, such as a boat's onboard power or traditional power available on land. The device could also have speakers to enable the user to listen to music via their electronic device. The storage compartment could be a subdivided section of the box or incorporated into one of the spinning/rotating compartments.

In operation, one uses the device in a normal manner with the bottom side (1102) on a flat surface. The user can, when desired, open or remove the lid (402), rotate the control knobs (406), which rotates the spindles of the device (412), which then exposes different portions of the spindles (412), to which the user will generally have different lures stored in the different portions of the spindles.

In operation, when the user wishes to extract a specific lure (1504), they will rotate the control knobs (1506), which spins the spindle (412), locate the desired lure and remove it from the device. In the embodiments of the FIGS., normal operation would be to use the device with the top in the open position, which exposes the cylinder storage compartments; however, the lid does not have to be in the open position to rotate the spindles (412), and the lid can also be transparent to allow the user viewing of the items which are stored.

The components of the device can be constructed from plastic but this is not intended to be limiting; other natural and synthetic materials that still allow for rotation of the spindles can be used.

Figure 2A:
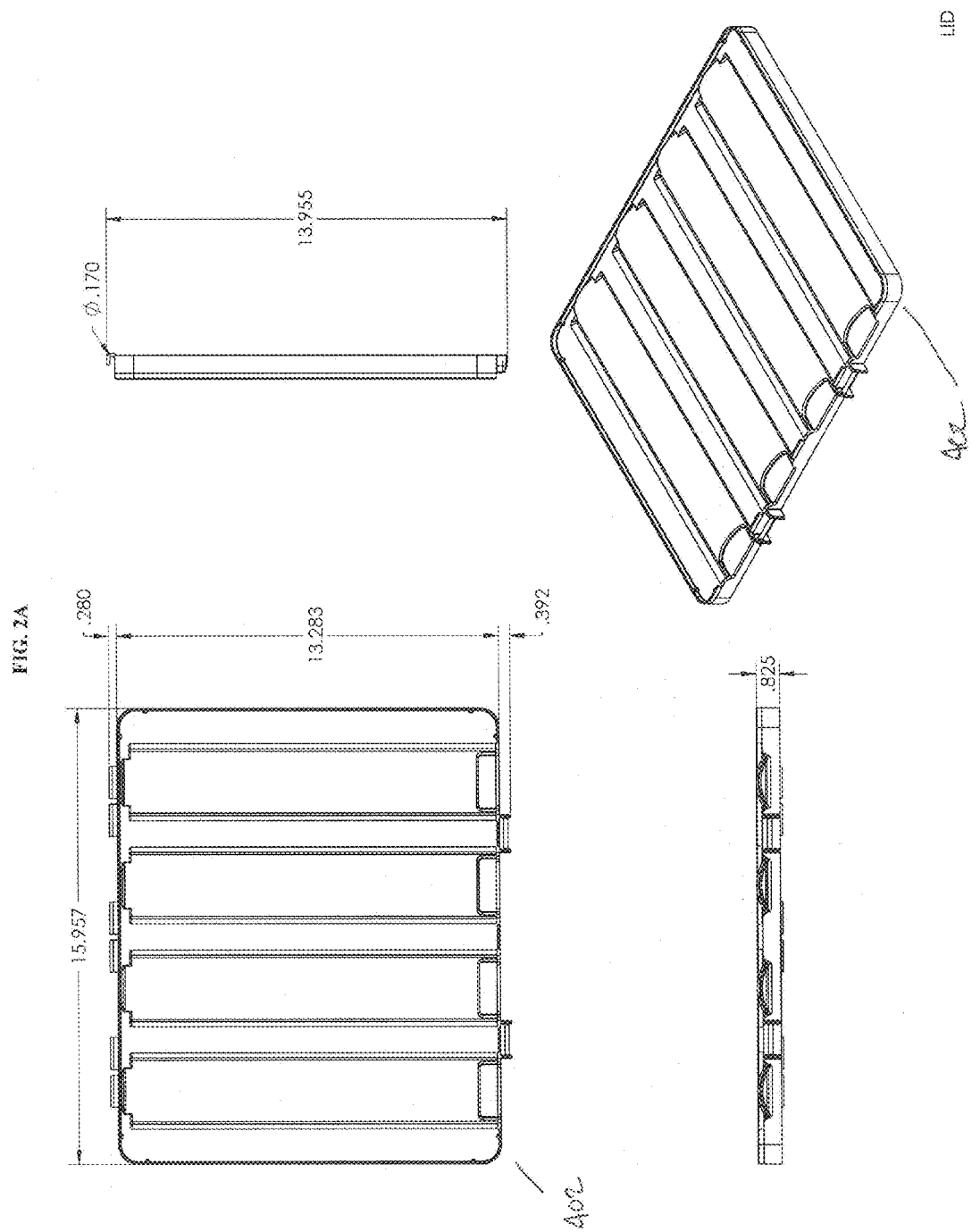
FIG. 2A provides a schematic and isometric drawing of an embodiment of a lid of the tackle box depicted in FIG. 1.
Figure 2C:
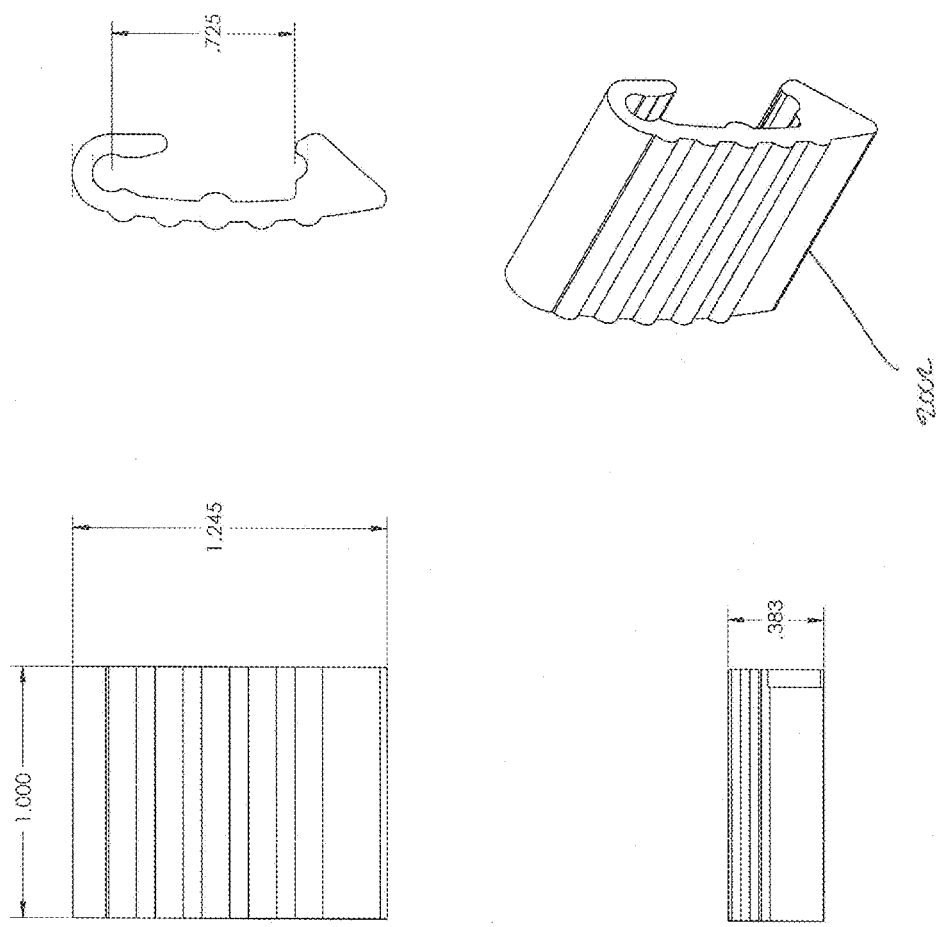
FIG. 2C provides a schematic and isometric drawing of an embodiment of a latch for the tackle box depicted in FIG. 1.
Figure 2E:
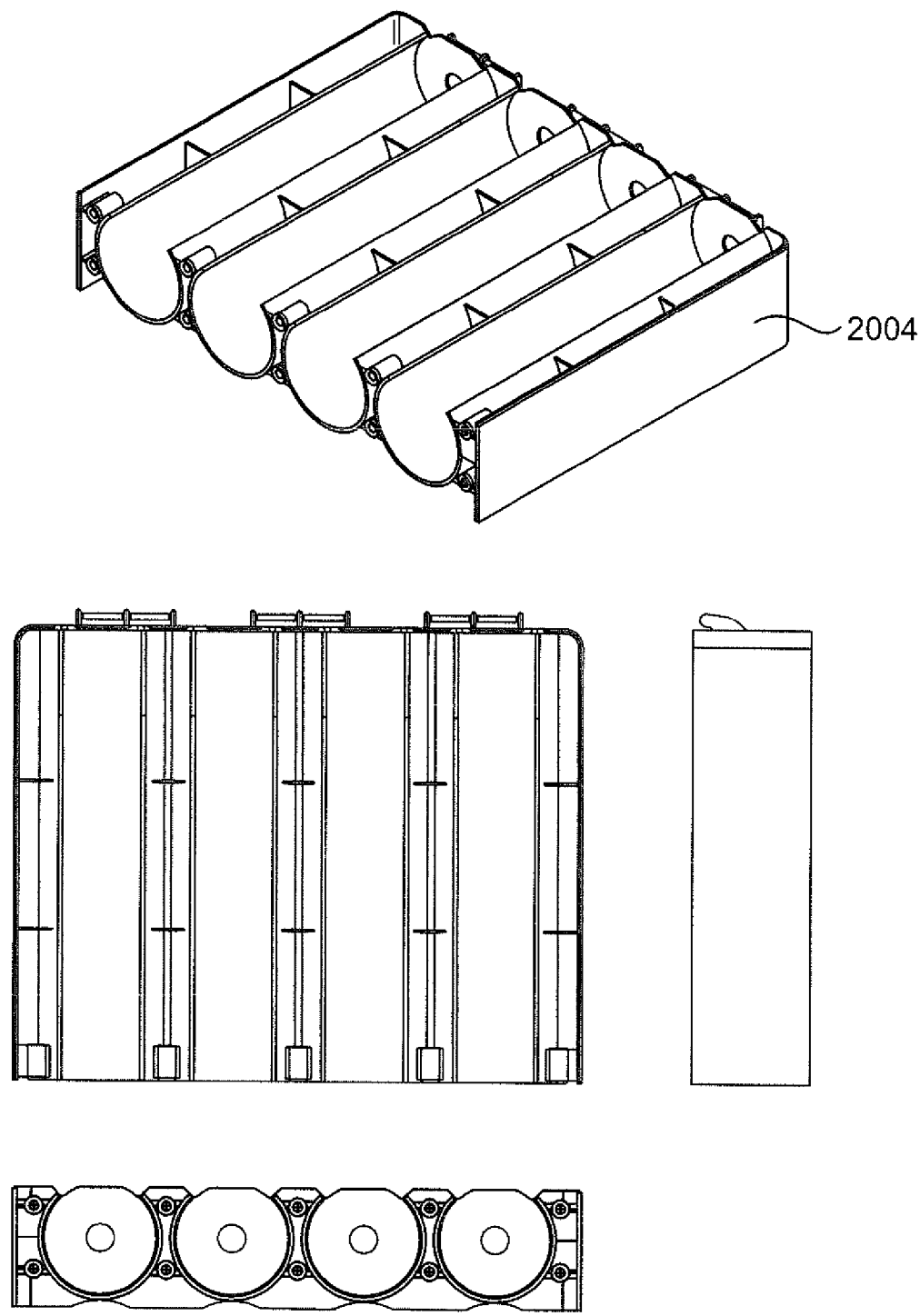
FIG. 2E provides a schematic and isometric drawing of an embodiment of a main body panel for the tackle box depicted in FIG. 1.
Figure 3:
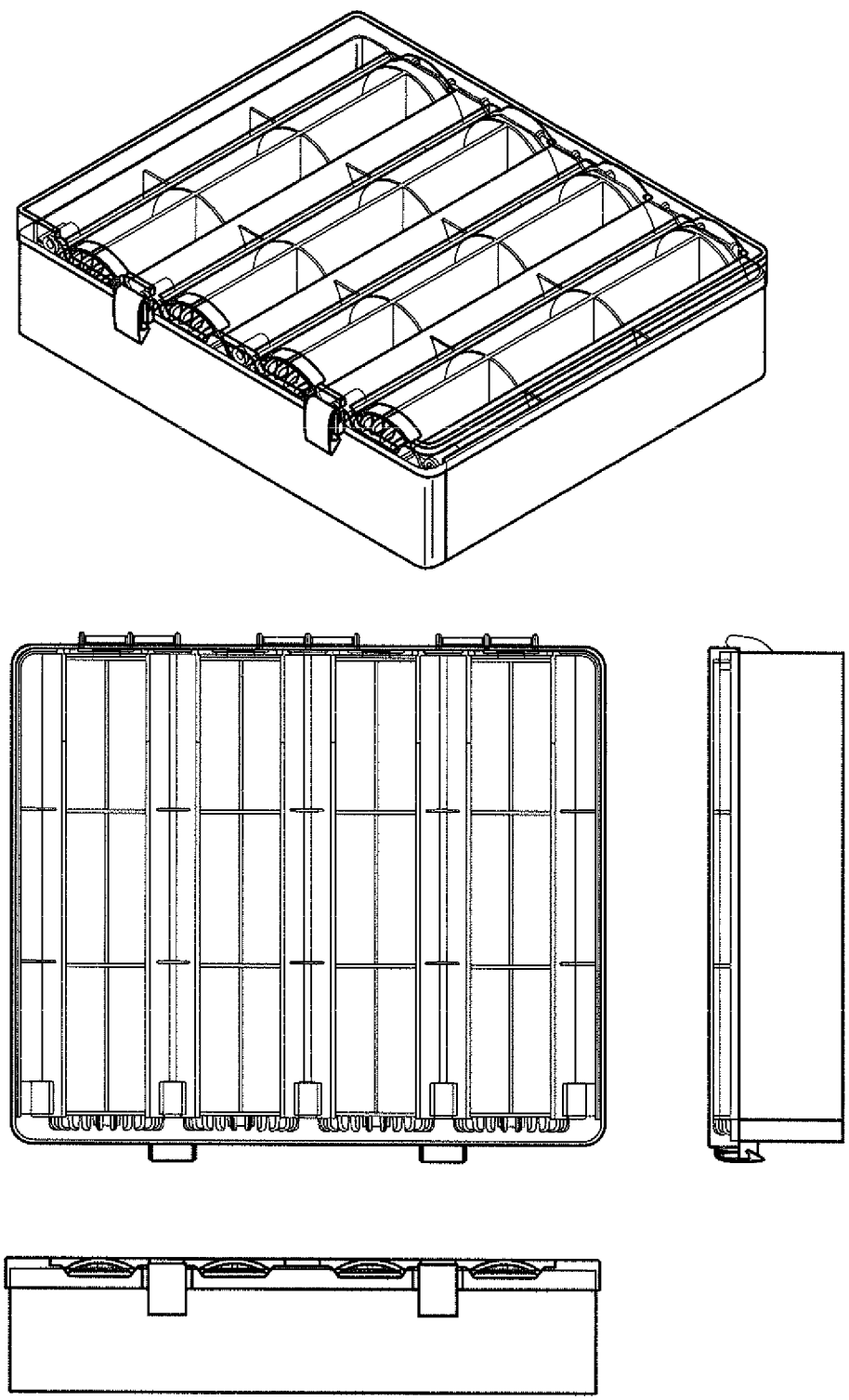
FIG. 3 provides a schematic and isometric transparent view of an embodiment of an assembled tackle box as depicted in FIG. 1.
Figure 4:
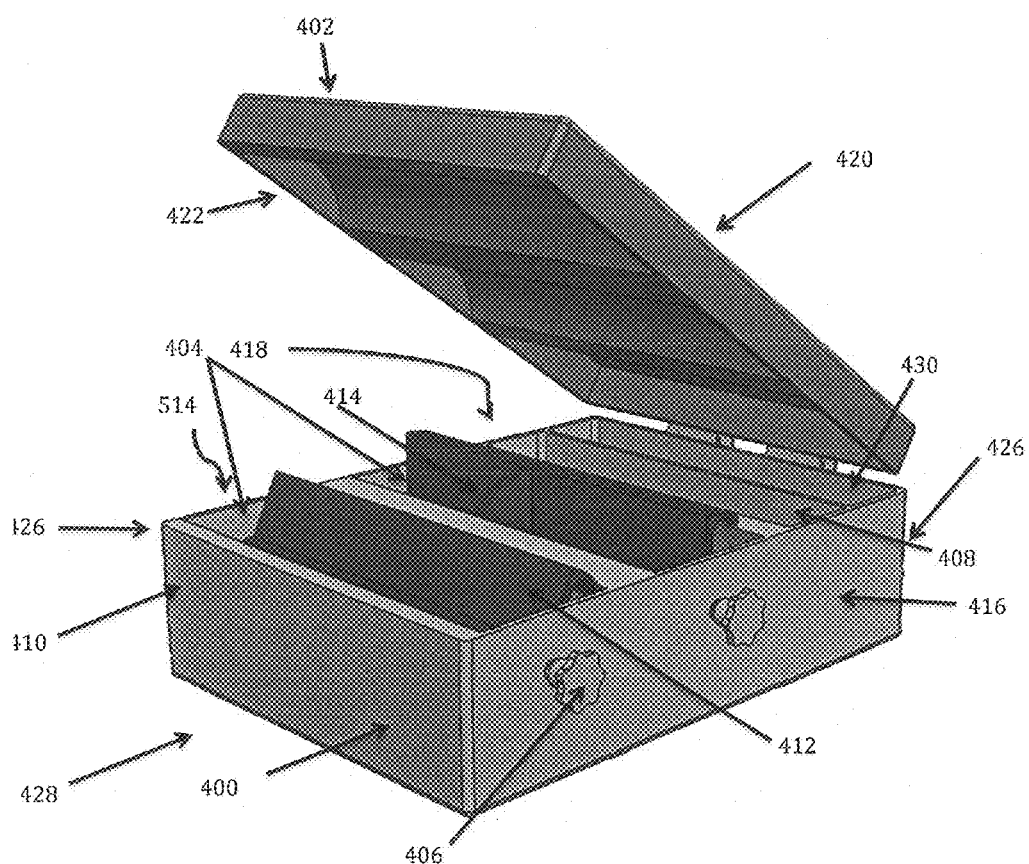
FIG. 4 provides a side perspective view of an alternative embodiment of a rotating tackle box in which the lid is in the open position.
Figure 5:
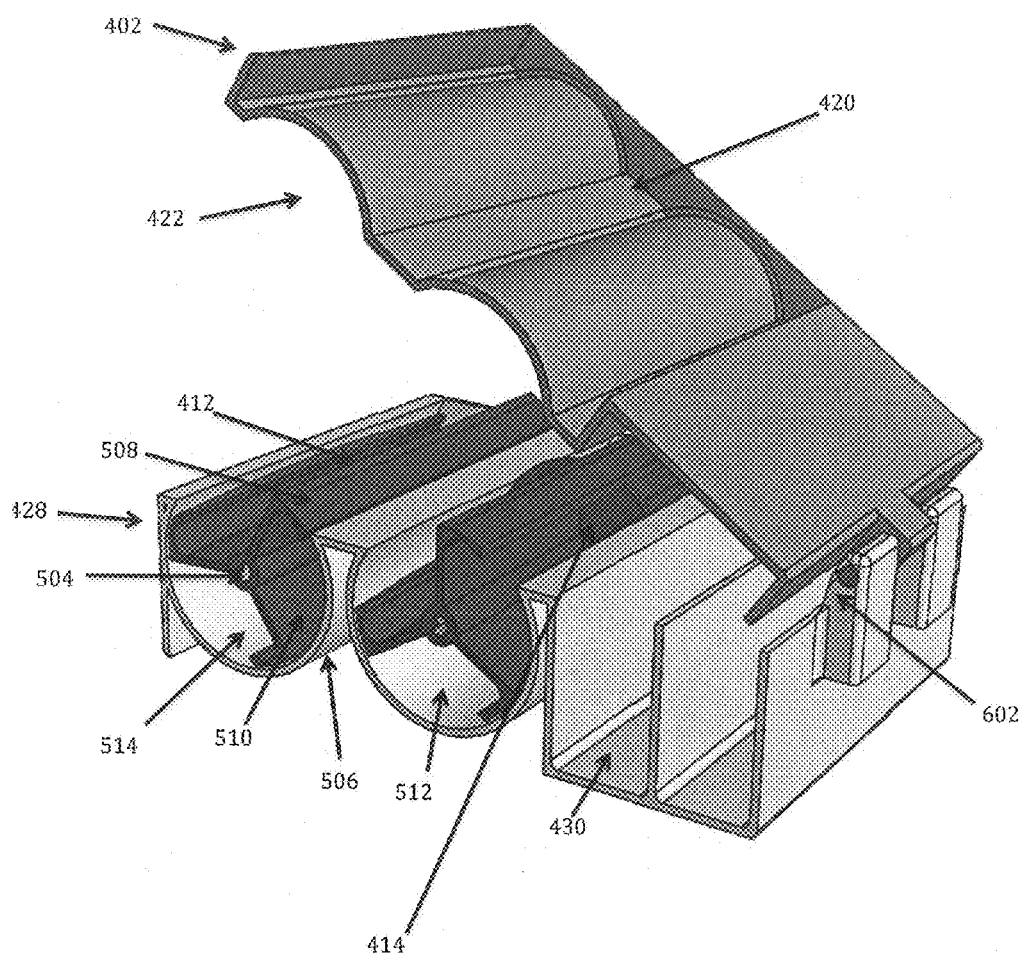
FIG. 5 provides a side perspective of a cutaway illustration of the embodiment FIG. 4 with the lid in the open position.

FIGS. 1-3 depict an embodiment of a tackle box showing an exemplary assembly. In the depicted embodiment of FIG. 1, the tackle box (400) comprises a main body (2004) and an front panel (2006) configured for attaching to the main body (2004) such that the combination of the front panel (2006) and main body (2004) form a tackle box bottom generally in the configuration of a rectangular prism. As described elsewhere herein, the interior of the box comprises a plurality of cavities (404), each of which is configured for accepting a roller or spindle (412). The lid (402) is generally held to the bottom using one or more latches (2002).

FIG. 2A depicts a lid for use with the tackle box depicted in FIG. 1, including dimensions of same. FIG. 2B depicts a roller or spindle for use with the tackle box depicted in FIG. 1, including dimensions of same. FIG. 2C depicts a latch for use with the tackle box depicted in FIG. 1, including dimensions of same. FIG. 2D depicts a front panel for use with the tackle box depicted in FIG. 1, including dimensions of same. FIG. 2E depicts a main body for use with the tackle box depicted in FIG. 1, including dimensions of same. FIG. 3 depicts the tackle box of FIG. 1 in a transparent view, as assembled.

While embodiments of the device have been described in detail, further embodiments will become apparent from a study of the accompanying Figures.

While the inventions have been disclosed in connection with certain preferred embodiments, this should not be taken as a limitation to all of the provided details of any invention. Modifications and variations of the described embodiments may be made without departing from the spirit and scope of any invention herein disclosed, and other embodiments should be understood to be encompassed in the present disclosure, as would be understood by those of ordinary skill in the art.

The invention claimed is:

1. A tackle box, comprising:
a housing having a housing interior volume and a housing inner surface;
a lid connected to said housing, said lid having a lid interior volume and a lid inner surface, wherein said lid can be opened to provide access to the housing interior volume and closed to prevent access to the housing interior volume;
said housing inner surface and said lid inner surface forming a plurality of cavities therebetween, each cavity of said plurality of cavities comprising a curved portion of said housing inner surface defining a portion of said housing interior volume and a curved portion of said lid inner surface defining a portion of said lid interior volume, and wherein each of said cavities is separated from another of said cavities by a planar portion of said housing inner surface and a planar portion of said lid inner surface which face each other and extend between the cavities when the lid is closed;
a plurality of spindles, one spindle of said plurality of spindles being located in a respective cavity of said cavities, and each spindle of said plurality of spindles having an elongated length; and
at least two partitions attached to each of said spindles, each partition of said at least two partitions so attached to extend along said length of a respective spindle of said plurality of spindles and extending from said respective spindle to said housing inner surface or to said lid inner surface when said lid is closed so as to subdivide said respective cavity of said plurality of cavities in which said respective spindle of said plurality of spindles is located into a plurality of storage compartments physically separated by said partitions;
wherein each spindle of said plurality of spindles is configured to rotate circularly within said respective cavity of said plurality of cavities.

2. The tackle box of claim 1, wherein the lid is removable.

3. The tackle box of claim 1, wherein rotating of said spindle is controlled via a control located on an exterior surface of the housing.

4. The tackle box of claim 1, wherein at least one partition of said at least two partitions is adjustable on at least one spindle of said plurality of spindles.

5. The tackle box of claim 1, wherein at least one spindle of said plurality of spindles is magnetic.

6. The tackle box of claim 5, wherein said at least one magnetic spindle of said plurality of spindles provides sufficient magnetic force to retain a lure containing a ferrous material within a respective one of said storage compartments during rotation of the spindles.

7. The tackle box of claim 1, wherein a hygroscopic substance is housed within the interior volume.

8. The tackle box of claim 1, wherein a lure is contained within one of said storage compartments.

9. The tackle box of claim 8, wherein said lure is selected from the group consisting of: jigs, surface lures, spoon lures, plugs, artificial flies, spinnerbait, swimbait, and fish decoys.

10. The tackle box of claim 1, wherein adjacent partitions of said at least two partitions are connected by at least one divider which serves to subdivide a respective one of said storage compartments into multiple smaller storage compartments.

11. The tackle box of claim 1, wherein said lid is transparent.

12. The tackle box of claim 1, wherein at least one partition of said at least two partitions has a fin extending therefrom.

* * * * *